Patented Aug. 30, 1938

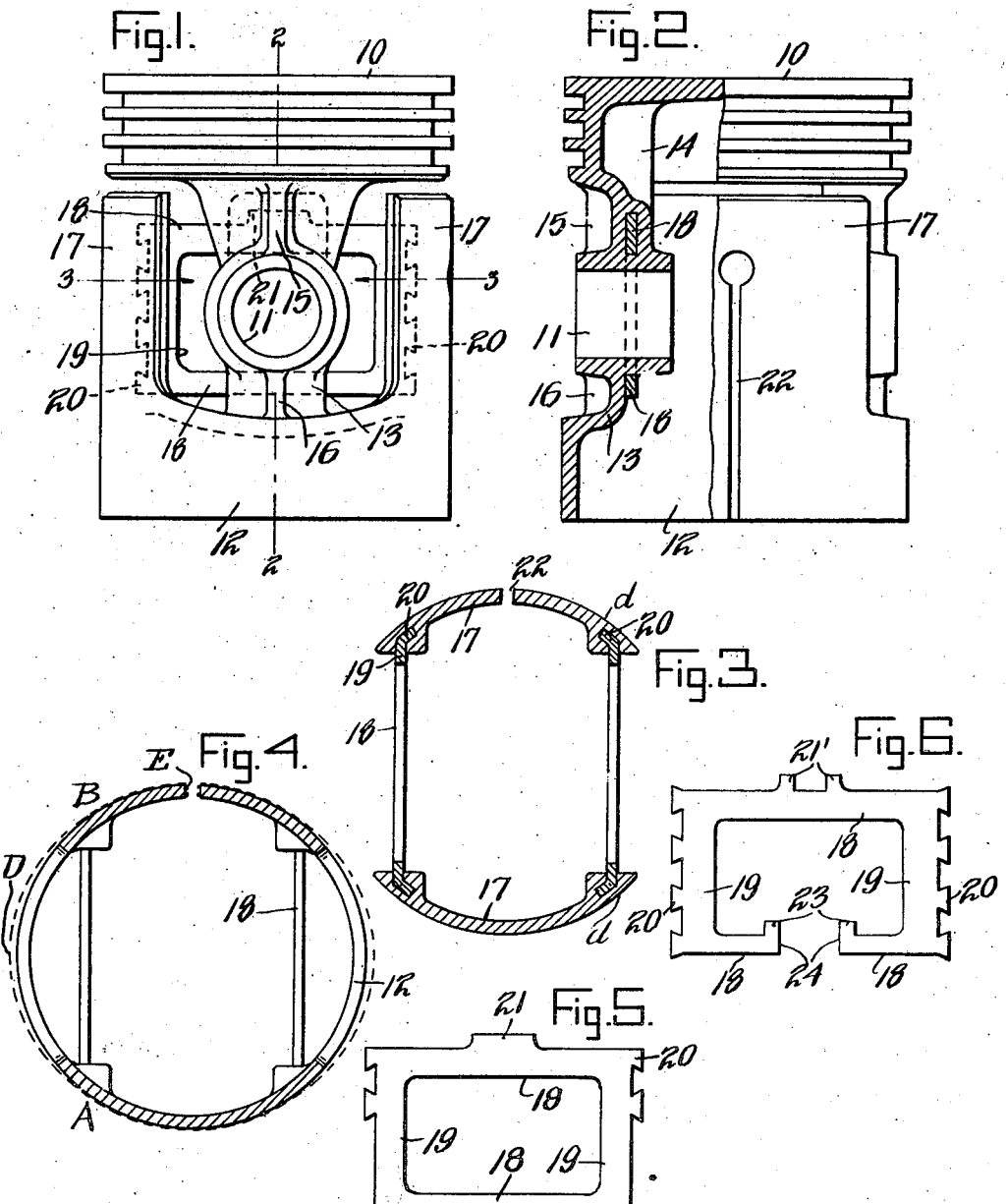

2,128,663

UNITED STATES PATENT OFFICE 2,128,663

PISTON

Adolph L. Nelson, Detroit, Mich., assignor to Bohn Aluminum & Brass Corporation, Detroit, Mich.

Application June 22, 1925, Serial No. 38,826
Renewed May 6, 1938

12 Claims. (Cl. 309—13)

My said invention relates to a piston made of suitable metal of high thermal qualities (as aluminum alloy) and given an added advantage by using a suitable metal in the form of struts so that the relative expansion of the piston will be approximately the same as the cylinder. A further purpose is to provide a design of parts which enables the piston bearing pressures to be distributed on the gliding surfaces of the skirt as may be desired for any given engine service required.

This is an extension of the principles disclosed in my co-pending applications No. 643,499, filed June 5, 1923, and No. 35,703, filed June 8, 1925.

In this piston I propose to control the decrease of expansion of the lower end of the skirt by degrees according to the limitation of the design while the decreased expansion of the upper end of the skirt will be identical with that in my former applications.

Referring to the accompanying drawing, which is made a part hereof and on which similar reference characters indicate similar parts, Figure 1 is an elevation of a piston according to my invention, Figure 2, a section on line 2—2 of Fig. 1, Figure 3, a section on line 3—3 of Fig. 1, Figure 4, a development showing the different positions assumed by the skirt at different temperatures, and Figures 5 and 6, elevations of modifications of the strut shown in Figures 1 to 4.

In the drawing reference character 10 indicates the head of the piston which may be of any conventional or desirable form and which has depending therefrom integral extensions providing bosses for piston pin bearings 11. The piston pin bearings are here shown as being connected to the cylindrical lower portion 12 of the skirt by means of a web 13.

The connection between the piston pin bosses and the head is strengthened by means of a post comprising an inner radial web 14 and an outer radial web 15, said webs being approximately in the plane of the axis of the piston pin and a similar post being provided at each side of the piston. The connection between the piston pin boss and the lower skirt portion is similarly re-enforced by a web 16.

The skirt has tongues or upward extensions 17 at opposite sides, these extensions being spaced from each other and from the piston pin bearings. The radial movement of the extensions is limited by means of struts 18 which are made of material relatively less expansible than that of the head and the skirt. For example, the head and skirt may be made of aluminum alloy and the struts may consist of steel stampings, as nickel-steel alloy which may be varied to suit the inexpansibility desired.

As here shown the strut portions, or limbs, above and below the piston pin bearings are tied together at their ends by portions or limbs 19 (Fig. 1) and as a combined unit they will be referred to as simply a strut. Then the ends of the struts are provided with projections 20 of dove-tailed form so that they will be securely locked to the material of the skirt which is cast about the struts. Above the piston pin bearing the upper limb of the strut is buried in the material of the piston pin boss, or rather, the neck connecting it to the head, and preferably this limb has some irregularity such as that indicated at 21, whereby it will be securely locked against endwise movement relative to the piston pin boss.

The lower limb of the strut, as indicated in Fig. 2, may be free relatively to the boss which is secured to the lower part of the skirt by the web 13, this part of the strut serving merely to connect the extensions of the skirt. As shown in Fig. 3, the struts may be bent at their ends to anchor them more securely in the material of the skirt and when this is done the dove-tailed construction may be omitted if preferred.

Another feature of my invention is a strut so formed that it can be positioned positively in the mold. The struts shown in Fig. 5 and Fig. 6 are held in the vertical position by limbs 18 (i. e. by the portions not covered by the metal of the piston) and they are held endwise by the inner edges of portions 19 joining the ends of the limbs. In general I provide holes, shoulders, indentures, bends, etc. at parts of the struts not covered by metal to be used to position the strut completely.

I prefer to form a slot at one side of the skirt as indicated at 22, or in some instances one shorter slot at each side, to permit automatic closing in of the skirt, which is an inherent part of this piston construction as hereinafter described.

In Fig. 5 I have illustrated a modified form. In the form as described the strut is anchored to the skirt along the entire length of each end. In some cases it is desirable to omit a portion of the dove-tailed projections or other construction by means of which the skirt and the strut are secured together. In this form the skirt when heated can recede slightly from the strut at the lower unanchored parts, permitting the lower end of the skirt to expand more evenly instead of bulging out at the sides, as hereinafter explained.

The operation of my devices above described may be explained as follows:

In Fig. 1 the skirt sections are anchored to each end of the strut. As the piston is heated the bottom of the skirt takes the form indicated by the dotted lines in Fig. 4 (exaggerated) since the arc AB expands at a faster ratio than chord AB, the former being a metal of higher expansion than the strut of chord AB. Actually in the cylinder the arc at D bears against the cylinder wall flexing the strut inwardly at the ends and automatically closing in the slot at E giving a slight clearance and a corresponding light bearing pressure at A and B in the cylinder. Also the bulge of arc AB has a tendency to decrease the diameter at E eliminating the conventional pressure along arc BE resulting from the piston skirt internal forces of expansion. This is a highly desirable quality since conventional pistons have too heavy a bearing at AB and arc BE (Fig. 4) and d—d (Fig. 3) with practically no pressure at D resulting in rapid wear on the main part of the skirt.

In Fig. 5 I show a means to vary the amount of skirt pressure that will obtain at the ends of the strut. By removing a portion of the dovetailing or other suitable anchorage of the strut towards the lower end of the skirt the skirt will be allowed to recede from the ends of the strut where the dove-tailing is removed. Hence the bulging out at D (Fig. 4) will be diminished and increased at A and B. This will also permit a slight expansion at E. Thus the piston will have a close fit in the cylinder when under working conditions, yet when starting a cold engine the struts will prevent the skirt from contracting to give an excessive piston clearance in the cylinder, i. e. preventing piston slaps when the piston is cold. The degree of change in pressures at D and AB (Fig. 4) depends on the amount of the dovetailing removed.

Another means of controlling the pressure at the ends of the strut is shown in Fig. 6. The lower limb 18 is cut at 24 and irregularities provided as at 23 so that the ends of the severed limb can be cast firmly in place in the piston boss or the neck thereof. The expansion of the limb overall is controlled by the distance allowed between ends 24.

The proportions of the strut are readily varied to suit the proportions of various pistons, as is also the anchorage to the metal cast about portions of the strut. If desired, the metal of the skirt at the ends of the strut can be run entirely around the strut section as at the center of the strut above the piston pin boss, as is shown in Fig. 2.

It is also obvious that the strut can be made of separate pieces of any desired cross section one above the boss and one below the boss or other suitable spacing arrangement and further they may be bent at the ends or otherwise formed to increase the anchorage.

The strut portion at the center above the boss is preferably anchored solidly in the neck above the boss, as shown in Fig. 2, while below the boss the strut portion need not be anchored since the skirt is tied to the boss at this point. The anchoring of the strut at the center above the boss prevents undue stresses from being set up in the lower part of the skirt. Although I prefer this construction I do not limit the design to anchoring the strut at the center above the boss nor do I limit myself to a strut which is not anchored at the center below the boss. It is also obvious that I do not have to limit myself to the omission of supplementary means of aiding the struts in spacing the skirt with relation to the remainder of the piston, as for instance, by casting integral relatively pliant webs between the bosses and the skirt.

On the other hand, I may anchor the struts so firmly in the bosses and the skirt that I can depend on the struts as the sole support of the skirt as in Fig. 1 if the webs 13 and ribs 16 were omitted. The principal object of my struts is to decrease or control the expansion of the skirt and the secondary object is to use the struts as a part or the sole spacing means in relation to other parts of the piston.

Having thus fully described my said invention, what I claim as new and desire to secure by Letters Patent is:

1. In a piston, a skirt having upward extensions, a head with integral piston pin bosses, struts having openings surrounding the piston pin bosses said struts having interlocking connections at their ends with the extensions of the skirt, and limbs above and below the bosses for the piston pin the lower limbs being movable relatively to the piston pin bosses, substantially as set forth.

2. In a piston, a skirt having upward extensions, a head with integral piston pin bosses, struts having openings surrounding the piston pin bosses said struts having interlocking connections at their ends with the extensions of the skirt, and limbs above and below the bosses for the piston pins the lower limbs being movable relatively to the piston pin bosses and the upper limbs being interlocked with the material of the piston pin bosses, substantially as set forth.

3. In a piston, a skirt having upward extensions, a head with integral bosses providing piston pin bearings, struts having openings surrounding the piston pin bearings said struts having interlocking connections at their ends with the extensions of the skirt, limbs above and below the bearings for the piston pin, the lower limb being interrupted midway of its length, and means for anchoring adjacent ends of the lower limb to the piston pin boss, substantially as set forth.

4. A piston comprising a head, piers depending from the head and carrying piston pin bosses, a skirt comprising a lower ring-like portion and tongues extending upwardly from the ring-like portion, the head and skirt being formed of lightweight material having a relatively high rate of thermal expansion, a pair of struts of material having a lower rate of thermal expansion than the skirt material extending substantially at right angles to the axis of the pin bosses from one tongue to the other, each strut being in the form of an open frame with a horizontal limb above the axis of the pin bosses and a horizontal limb below the axis of the pin bosses, the upper ends of the struts carrying interlocking formations buried in the tongues, the lower end of the struts being free of such interlocking formations.

5. A piston comprising a head, piers depending from the head and carrying piston pin bosses, a skirt comprising a lower ring-like portion and tongues extending upwardly from the ring-like portion, the head and skirt being formed of lightweight material having a relatively high rate of thermal expansion, a pair of struts of material having a lower rate of thermal expansion than the skirt material extending substantially at right angles to the axis of the pin bosses from one tongue to the other, each strut being in the form of an open frame with a horizontal limb above the axis of the pin bosses and a horizontal limb below the axis of the pin bosses, the ends of the struts being connected to the tongues, the lower limb of each strut being movable relative to a pier.

6. A piston comprising a head, piers depending from the head and carrying pin bosses, a lower annular portion, tongues extending upwardly from the annular portion, the head and tongues being formed of light-weight piston material, a pair of struts formed of material having a lower rate of thermal expansion than the material of the thrust faces, the struts extending chordally of the skirt with their ends anchored in the tongues, each strut being in the form of an open frame with a limb above a pin boss and a limb below a pin boss, the upper limb of each strut having an anchoring formation completely surrounded by the material of a pier to prevent endwise movement of the limb through the pier.

7. A piston comprising a head, piers depending from the head and having piston pin bosses formed therein, cylinder-bearing portions lying between the piers and formed of relatively light-weight material, a pair of frame struts of relatively inexpansible material extending between the cylinder-bearing portions and surrounding the pin bosses, the intermediate part of the upper member of each strut carrying an anchoring formation buried in the material of a pier to prevent endwise movement of the limb through the pier.

8. A piston comprising a head, piers depending from the head and having piston pin bosses formed therein, cylinder-bearing portions lying between the piers and formed of relatively light-weight material, a pair of frame struts of relatively inexpansible material extending between the cylinder-bearing portions and surrounding the pin bosses, each strut having vertical end bars, the upper and lower parts of each vertical member carrying anchoring formations, each anchoring formation being buried in a cylinder-bearing portion.

9. A piston comprising a head, piers depending from the head and carrying piston pin bosses, a skirt comprising a lower ring-like portion and tongues extending upwardly from the ring-like portion, the head and skirt being formed of light-weight material having a relatively high rate of thermal expansion, a pair of struts of material having a lower rate of thermal expansion than the skirt material extending substantially at right angles to the axis of the pin bosses from one tongue to the other, each strut being in the form of an open frame with a horizontal limb above the axis of the pin bosses and a horizontal limb below the axis of the pin bosses, the lower limb being divided in the middle and having its ends engaging the pier.

10. A piston comprising a head, piers depending from the head and carrying piston pin bosses, a skirt comprising a lower ring-like portion and tongues extending upwardly from the ring-like portion, the head and skirt being formed of light-weight material having a relatively high rate of thermal expansion, a pair of struts of material having a lower rate of thermal expansion than the skirt material extending substantially at right angles to the axis of the pin bosses from one tongue to the other, each strut being in the form of an open frame with a horizontal limb above the axis of the pin bosses and a horizontal limb below the axis of the pin bosses, the lower limb being divided in the middle and having its ends embedded in the pier.

11. A piston comprising a head, piers depending from the head and carrying pin bosses, a skirt comprising opposed thrust faces, the head and skirt being formed of light-weight material having a relatively high rate of thermal expansion, a pair of struts of material having a lower rate of thermal expansion than the skirt material extending substantially at right angles to the axis of the pin bosses from one thrust face to the other, each strut being in the form of a rectangular open frame with a horizontal limb above the axis of the pin bosses and a horizontal limb below the axis of the pin bosses and a pair of vertical end bars, the upper part of each vertical end bar carrying an anchoring formation buried in a thrust face, the lower part of each vertical end bar being free of anchoring formations buried in the cylinder-bearing portions.

12. A piston comprising a skirt having upward extensions, a pair of struts extending across the skirt, each strut having the form of a hollow rectangle with upper and lower limbs connecting said extensions, and dove-tail interlocking means connecting the upper end portions of the struts to the respective skirt sections.

ADOLPH L. NELSON.